(12) United States Patent
Xiao et al.

(10) Patent No.: US 9,058,734 B2
(45) Date of Patent: Jun. 16, 2015

(54) ALERT SENSING AND MONITORING VIA A USER DEVICE

(71) Applicant: Verizon Patent and Licensing Inc., Basking Ridge, NJ (US)

(72) Inventors: Hong Xiao, Acton, MA (US); Azim Nasir, Foxboro, MA (US); Dongchen Wang, Concord, MA (US); Andre R. Turner, Belmont, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 49 days.

(21) Appl. No.: 14/035,220

(22) Filed: Sep. 24, 2013

(65) Prior Publication Data

US 2015/0084770 A1     Mar. 26, 2015

(51) Int. Cl.
*G08B 21/00* (2006.01)
*G08B 25/01* (2006.01)
*H04L 29/06* (2006.01)
*G06F 17/30* (2006.01)

(52) U.S. Cl.
CPC .......... *G08B 25/016* (2013.01); *H04L 63/1433* (2013.01); *G06F 17/30864* (2013.01); *H04L 63/1416* (2013.01)

(58) Field of Classification Search
CPC . H04L 63/1433; H04L 63/1416; H04L 29/06; G06F 17/30864

USPC .............. 340/540; 707/758; 709/225; 726/25
See application file for complete search history.

(56) References Cited

U.S. PATENT DOCUMENTS

| | | | |
|---|---|---|---|
| 7,917,393 B2 * | 3/2011 | Valdes et al. .................... 726/23 |
| 8,171,458 B2 * | 5/2012 | Cheng et al. ................... 717/126 |
| 8,402,041 B2 * | 3/2013 | Chakra et al. ................. 707/758 |
| 8,607,353 B2 * | 12/2013 | Rippert et al. .................. 726/25 |
| 2014/0129536 A1 * | 5/2014 | Anand et al. .................. 707/706 |
| 2014/0282934 A1 * | 9/2014 | Miasnik et al. .................... 726/5 |
| 2014/0358587 A1 * | 12/2014 | Cao et al. .......................... 705/3 |

\* cited by examiner

*Primary Examiner* — John A Tweel, Jr.

(57) ABSTRACT

A device may configure recognition of a first alert. The device may store information associated with recognition of the first alert. The device may determine a response action to be associated with recognition of the first alert. The device may store information identifying an association between the first alert and the response action. The device may detect a second alert. The device may determine that the second alert matches the first alert based on the information associated with recognition of the first alert. The device may retrieve the stored information identifying the association between the first alert and the response action based on determining that the second alert matches the first alert. The device may perform the response action based on retrieving the stored information identifying the association between the first alert and the response action.

20 Claims, 14 Drawing Sheets

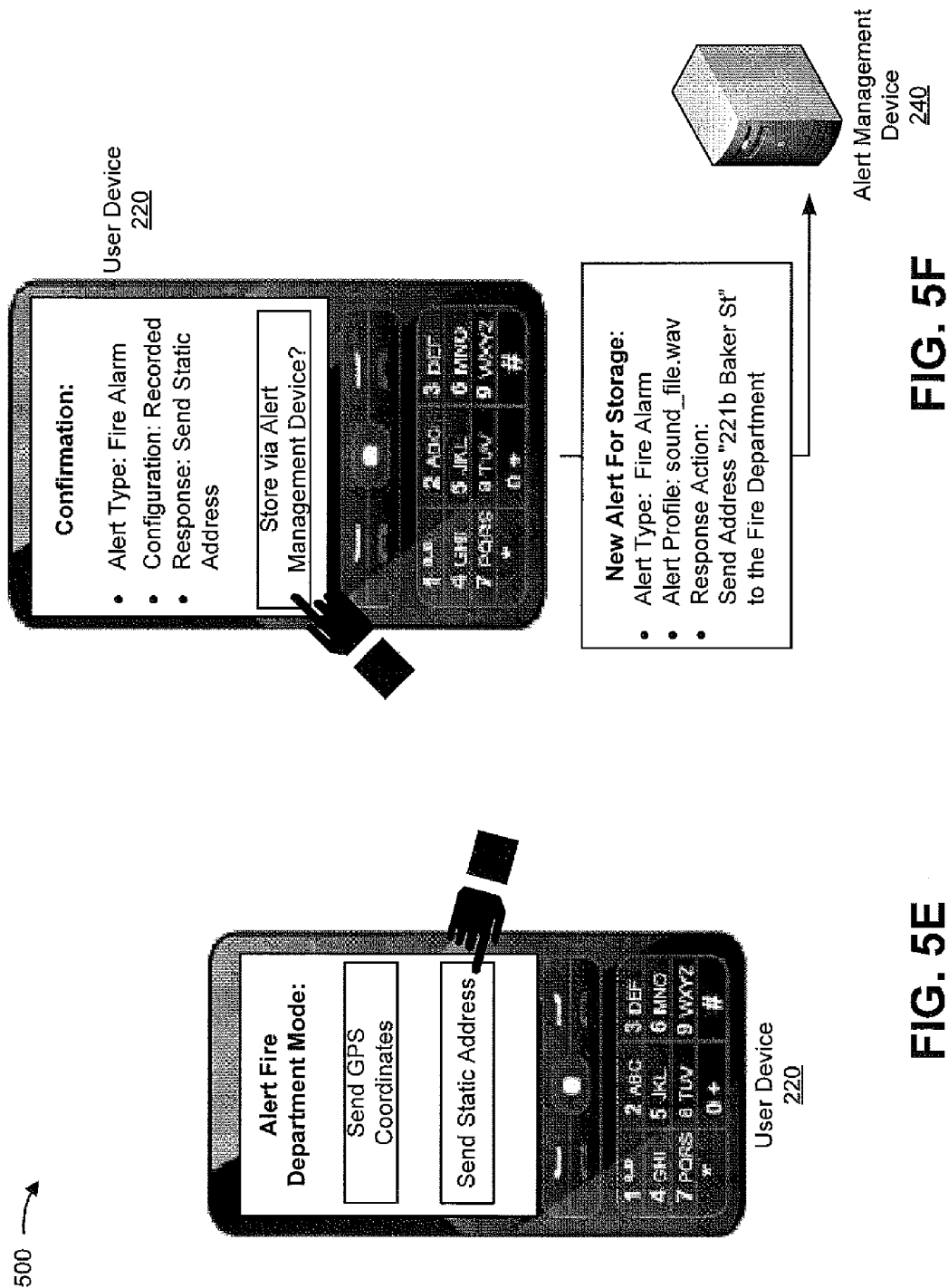

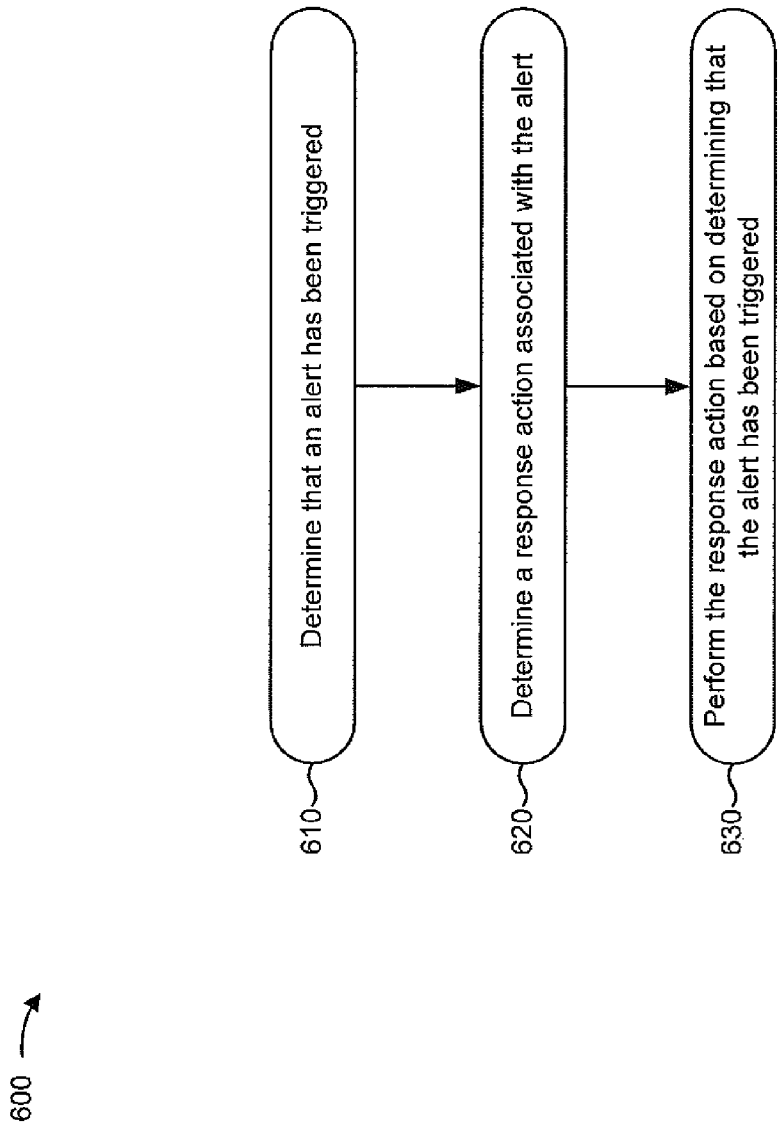

US 9,058,734 B2

ALERT SENSING AND MONITORING VIA A USER DEVICE

BACKGROUND

A house may include an alert device, such as a smoke alarm, a security alarm, or the like, capable of providing an alert identifying a status of the house. The alert device may utilize an alert, such as an audible alert, a visual alert, a vibrating alert, or the like. The alert device may connect to a monitoring service via a public switched telephone network.

BRIEF DESCRIPTION OF THE DRAWINGS

FIGS. 5A-5F are diagrams of an example implementation relating to the example process shown in FIG. 4;

FIG. 6 is a flow chart of an example process for monitoring an alert via a user device;

DETAILED DESCRIPTION OF PREFERRED EMBODIMENTS

The following detailed description of example implementations refers to the accompanying drawings. The same reference numbers in different drawings may identify the same or similar elements.

An alert device, such as a smoke alarm, a security alarm, or the like, may provide notifications associated with the status of an associated system. The alert device may use a manufacturer-determined notification type (e.g., a sound, a flashing light, etc.) to alert a user within a particular proximity to the alert device of the status of the associated system. The alert device may connect to a dedicated monitoring service associated with the alert device to provide a notification to a notification recipient not within the particular proximity of the alert device, such as another user, a dispatch associated with the alert device (e.g., a fire department dispatch, a police department dispatch, etc.), or the like. However, providing a notification via a dedicated monitoring service may require connection via a particular network associated with the monitoring service, may be costly, and may require designed compatibility between the alert device and the monitoring service. Implementations described herein may assist a user in monitoring an alert device by configuring a user device to recognize that an alert has been triggered, and to perform a response action based on recognizing that the alert has been triggered.

Figure 1:
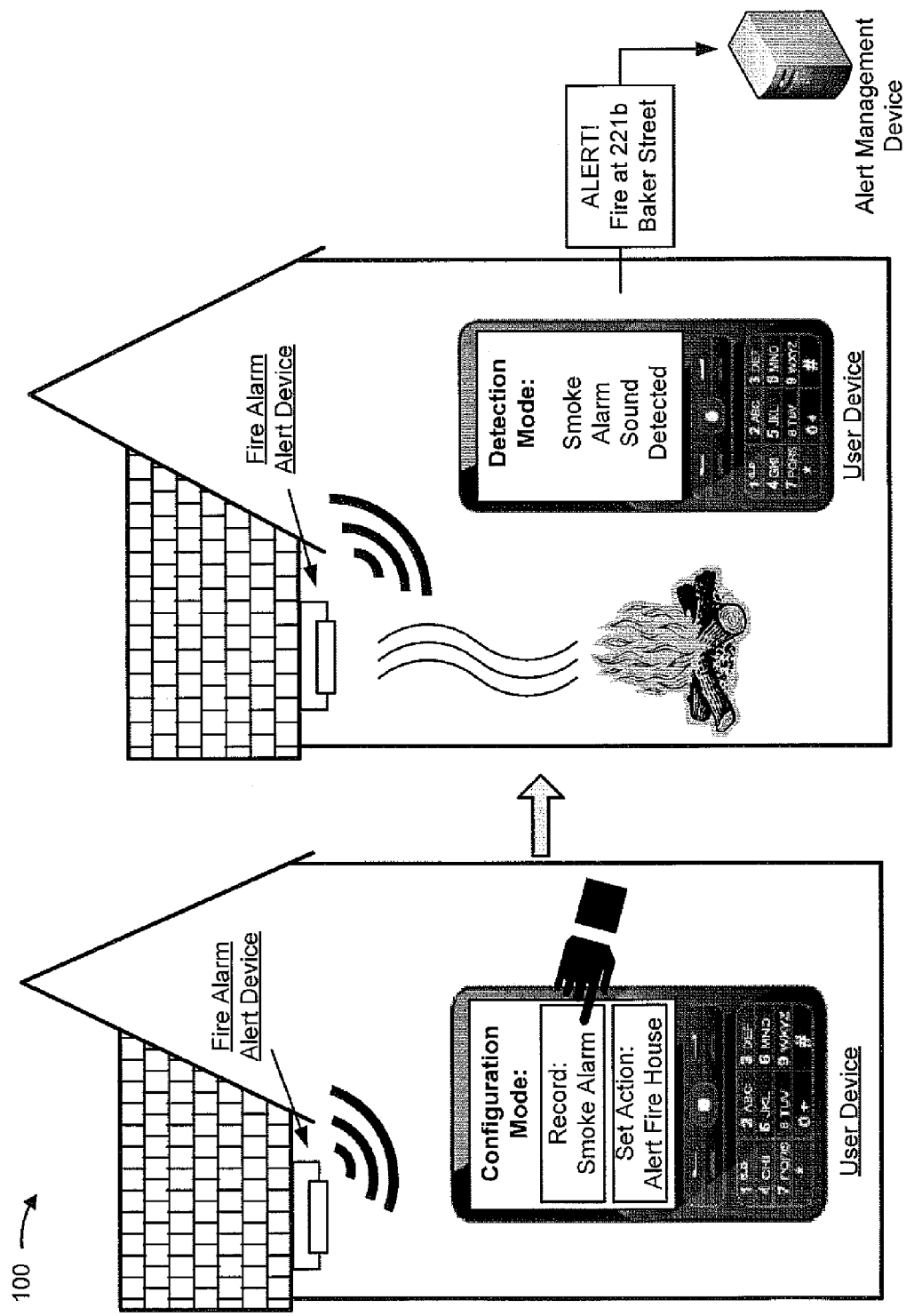
FIG. 1 is a diagram of an overview of an example implementation described herein.

FIG. 1 is a diagram of an overview of an example implementation 100 described herein. Example implementation 100 may include a user device, an alert device, and an alert management device. As shown in FIG. 1, a user may configure the user device to recognize an alert provided by the alert device by recording the alert that is used by the alert device (e.g., an audible alert, a visual alert, etc.). In another example, the user device may configure recognition of an alert by querying the alert management device to access information identifying the alert that is used by the alert device. The user device may store information associated with determining that the alert device has been triggered. The user device may determine a response action that is to be performed based on determining that the alert device has been triggered. For example, the user device may provide information identifying a location associated with the alert device. The user device may store an association between the alert and the response action (e.g., via the alert management device).

As further shown in FIG. 1, the user device may detect a potential alert (e.g., via a microphone, via a camera, etc.). The user device may determine that a similarity measurement, such as a wave form similarity, a frequency similarity, an image similarity, or the like, between the detected alert and the configured alert satisfies a threshold. The user device may determine that the alert device has been triggered based on determining that the similarity measurement satisfies the threshold. In another example, the user device may provide information associated with the detected alert to the alert management device for processing. The user device may determine the response action associated with determining that the alert device has been triggered. The user device may perform the response action, such as by providing a notification to the alert management device that the alert has been triggered, by notifying another device that the alert has been triggered, or the like. In this way, a user device may monitor an alert device and perform an action based on determining that the alert device has been triggered.

Figure 2:
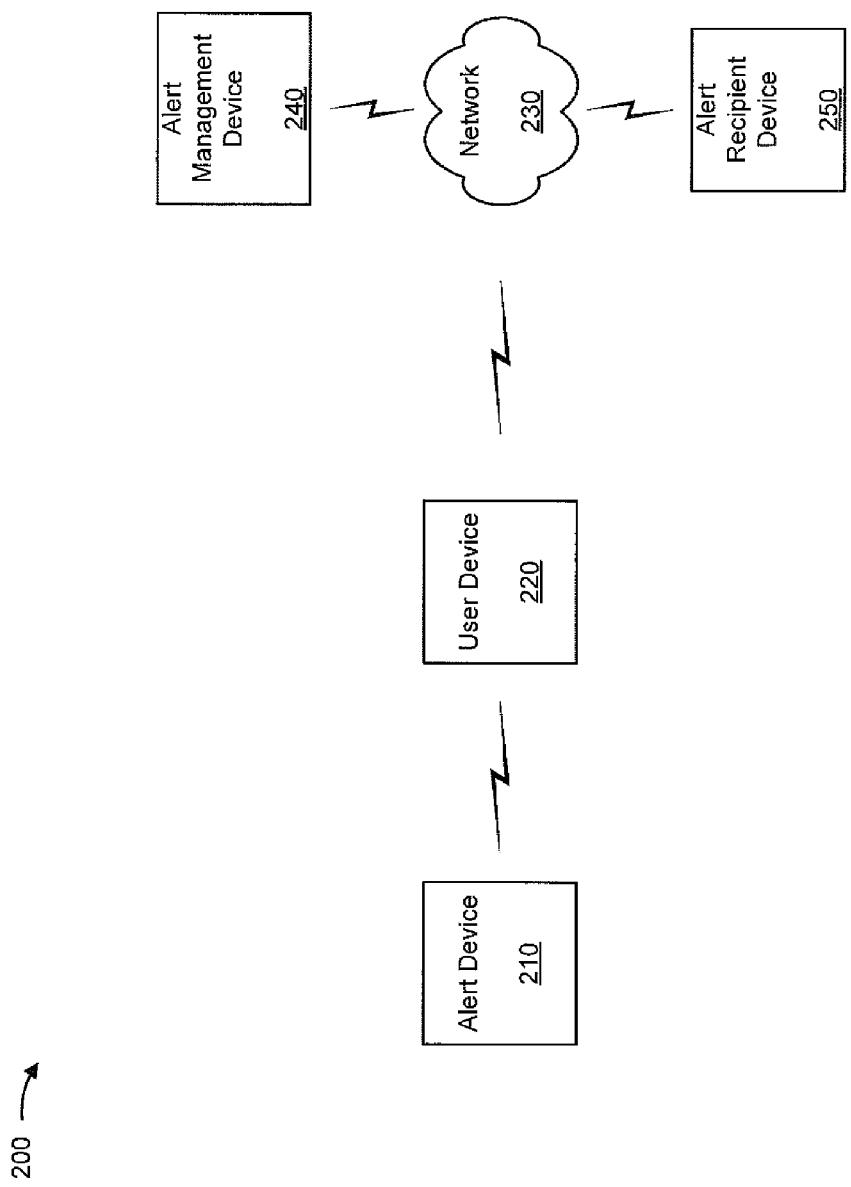
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include alert device 210, user device 220, network 230, alert management device 240, and alert recipient device 250. Devices of environment 200 may interconnect via wired connections, wireless connections, or a combination of wired and wireless connections.

Alert device 210 may include one or more devices capable of providing an alert. For example, alert device 210 may include an alarm device that provides alerts, such as audible alerts, visual alerts, or the like. In some implementations, alert device 210 may be associated with one or more sensor devices that may provide an alert, such as a sensor associated with a fire alarm (e.g., a carbon dioxide sensor, a carbon monoxide sensor, a heat sensor, a smoke sensor, etc.), a sensor associated with an appliance (e.g., a washing machine cycle sensor, a refrigerator door sensor, etc.), a sensor associated with a security system (e.g., a window sensor, a motion sensor, a glass break sensor, a door sensor, etc.), or the like. In some implementations, alert device 210 may have a standardized notification type (e.g., a particular amplitude, a particular frequency, a particular pattern, etc.). In some implementations, alert device 210 may be used broadly to refer to a device capable of providing an audible alert (e.g., an instrument), a visual alert (e.g., a light switch), or the like.

User device 220 may include one or more devices capable of receiving, generating, processing, storing, and/or providing information associated with an alert. For example, user device 220 may include a mobile phone (e.g., a smart phone), a radiotelephone, a personal communications system (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), or a similar type of device. In some implementations, user device 220 may include one or more sensors for detecting alerts, such as an audio sensor (e.g., a microphone), a visual sensor (e.g., a camera), or the like. In some implementations, user device 220 may provide configuration information to alert management device 240, and may receive information associated with determining that an alert has been detected from alert management device 240. In some implementations, user device 220 may be configured to detect alerts from alert device 210. Additionally, or alternatively, user device 220 may be configured to detect an alert from a source other than alert device 210, such as detecting light from a lightning strike, sub-audible vibrations from a termite colony, or the like.

Network 230 may include one or more wired and/or wireless networks. For example, network 230 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. In some implementations, user device 220 may provide information to and/or receive information from alert management device 240 via network 230.

Alert management device 240 may include one or more devices capable of receiving, generating, processing, storing, and/or providing information associated with an alert. For example, alert management device 240 may include a server device capable of storing information associated with the alert, such as a response action, a similarity threshold, or the like. In some implementations, alert management device 240 may receive information identifying a detected alert from user device 220, and may determine a similarity measurement between the detected alert and a configured alert. In some implementations, alert management device 240 may perform a response action (e.g., providing information identifying the alert to alert recipient device 250 via network 230) based on determining that alert device 210 has been triggered.

Alert recipient device 250 may include one or more devices capable of receiving information associated with an alert. For example alert recipient device 250 may include a server (e.g., a dispatch server associated with a fire department, with a police department, etc.), a remote notification device (e.g., a mobile phone, a computer, a television, etc.), or the like. In some implementations, alert recipient device 250 may be capable of having a configuration adjusted as a result of a response action. For example, when a fire alarm is detected, alert recipient device 250 may receive information from alert management device 240 (e.g., via network 230) indicating that a silent mode associated with alert recipient device 250 is to be made inactive.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while user device 220 and alert management device 240 are shown as separate devices, user device 220 and alert management device 240 may be implemented in a single device. Additionally, one or more of the devices of environment 200 may perform one or more functions described as being performed by another one or more devices of environment 200.

Figure 3:
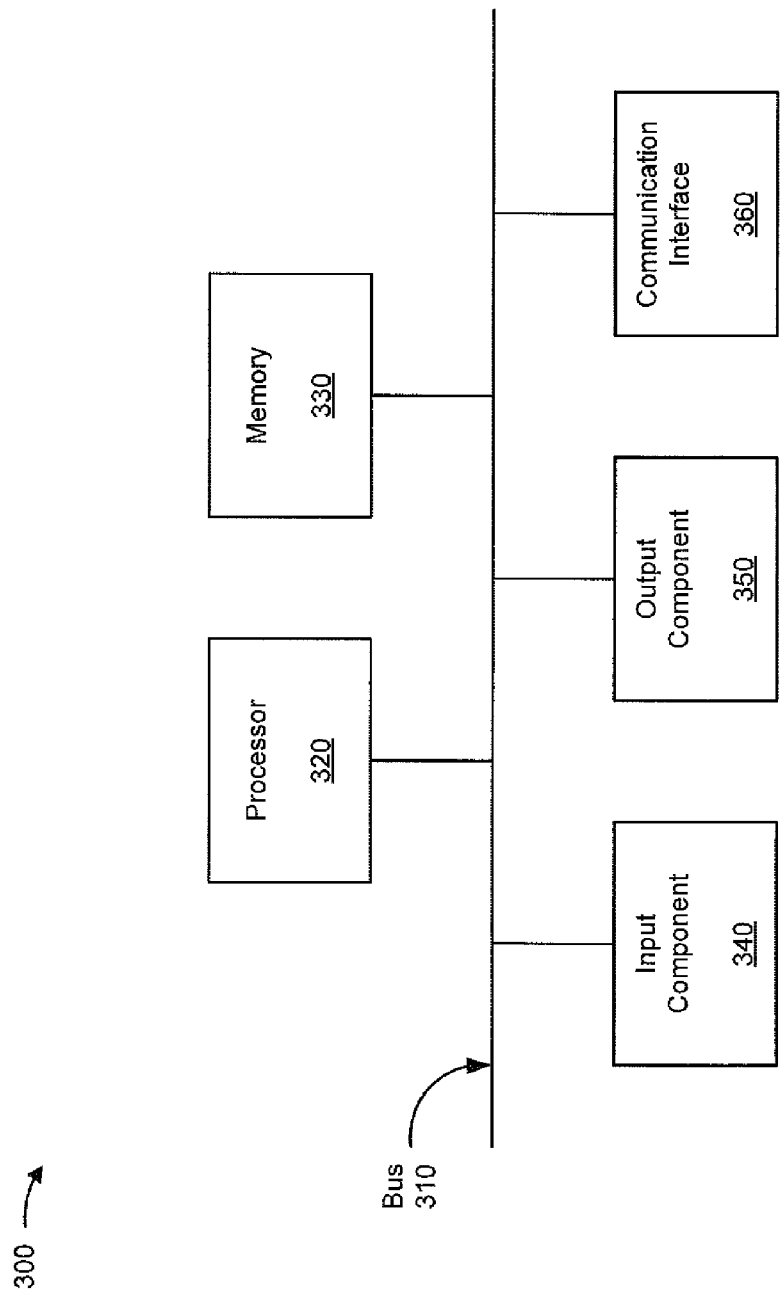
FIG. 3 is a diagram of example components of one or more devices of FIG. 2.

FIG. 3 is a diagram of example components of a device 300. Device 300 may correspond to alert device 210, user device 220, alert management device 240, and/or alert recipient device 250. In some implementations, each of alert device 210, user device 220, alert management device 240, and/or alert recipient device 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits an input of information to device 300 (e.g., a touch screen display, a keyboard, a keypad, a mouse, a button, a switch, a microphone, a camera, a light sensor, a motion sensor, an accelerometer, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
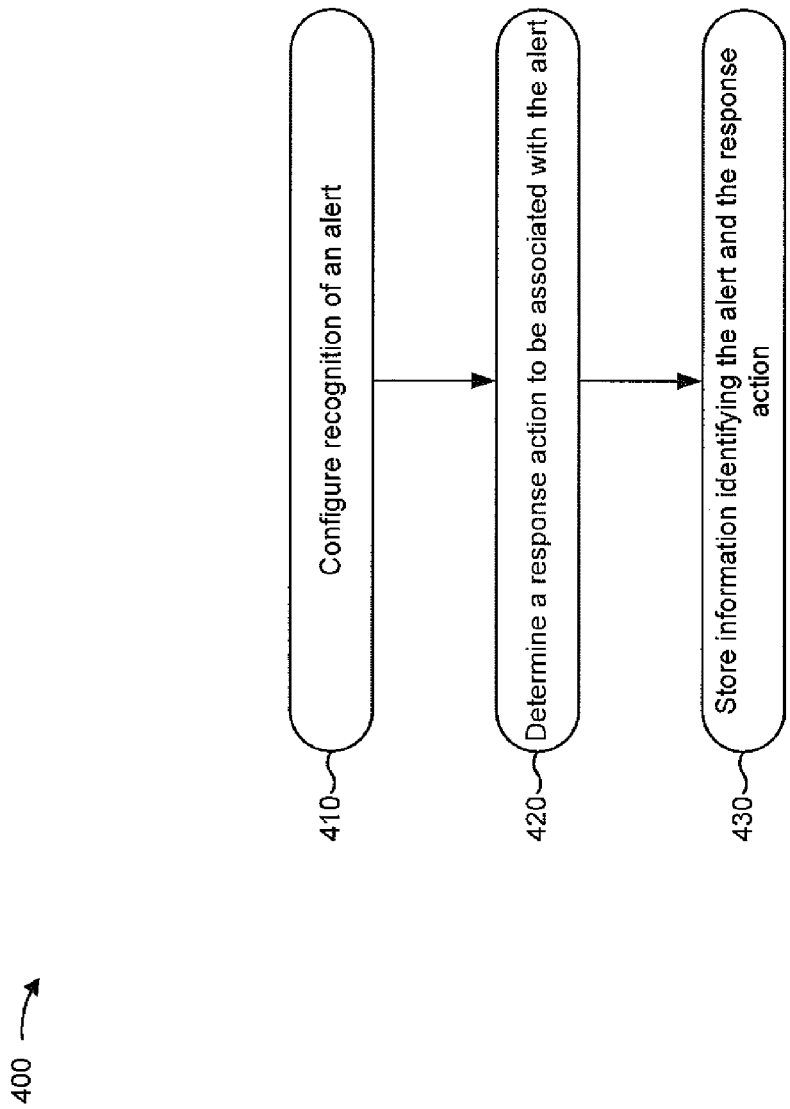
FIG. 4 is a flow chart of an example process for configuring a user device to monitor an alert.

FIG. 4 is a flow chart of an example process 400 for configuring a user device to monitor an alert. In some implementations, one or more process blocks of FIG. 4 may be performed by user device 220. Additionally, or alternatively, one or more process blocks of FIG. 4 may be performed by another device or a group of devices separate from or including user device 220, such as alert device 210, alert management device 240, and/or alert recipient device 250.

As shown in FIG. 4, process 400 may include configuring recognition of an alert (block 410). For example, user device 220 may be configured to recognize an alert provided by alert device 210. An alert may include a notification, such as a sound wave notification (e.g., a longitudinal wave carrying an audible sound wave notification, an inaudible sound wave notification, etc.), an electromagnetic wave notification (e.g., a visible spectrum notification, a non-visible spectrum notification, etc.), or the like. In some implementations, the alert may be associated with alert device 210. Additionally, or alternatively, the alert may be associated with another source, such as a lightning strike (e.g., the alert may refer to light associated with the lightning strike, sound associated with the lightning strike, etc.), a termite infestation (e.g., the alert may refer to sub-audible vibrations from the termite infestation), a person (e.g., the alert may refer to a voice, a clap, etc.), or the like.

Recognition of an alert may be performed via a sensor (e.g., an input component) associated with user device 220, in some implementations. For example, user device 220 may recognize the alert via one or more sensors, such as a microphone, a camera, a motion-sensor, or the like.

Configuring recognition of the alert by user device 220 may include selecting a particular alert device 210 to be monitored, in some implementations. For example, user device 220 may determine the particular alert device 210 that is to be monitored, such as a smoke alarm, a security alarm, a carbon monoxide alarm, a heart monitoring device, a refrigerator door position monitoring sensor, a washing machine cycle sensor, or the like. In some implementations, user device 220 may provide, for selection by a user of user device 220, information identifying one or more alert devices 210 that may be monitored. Additionally, or alternatively, user device 220 may receive input identifying the particular alert device 210.

Configuring recognition of the alert may include determining an alert profile, in some implementations. An alert profile may refer to one or more characteristics of the alert, such as a wave form, a frequency, an amplitude, a pattern, or the like. In some implementations, user device 220 may determine the alert profile based on recording the alert from alert device 210. For example, user device 220 may record an audible alert from alert device 210 via a microphone. Additionally, or alternatively, user device 220 may determine the alert profile based on an alert source identifier of alert device 210. An alert source identifier may include information identifying alert device 210, such as a manufacturer identifier, a global trade item number (e.g., a universal product code, a manufacturer part number, etc.), or the like. For example, user device 220 may query a data structure (e.g., stored by user device 220, stored by alert management device 240, stored by a server, etc.) to determine the alert profile associated with alert device 210. Additionally, or alternatively, user device 220 may receive information identifying one or more alert profiles for monitoring from alert management device 240. For example, user device 220 may be configured to monitor for one or more alerts based on receiving the one or more alert profiles. In some implementations, an alert profile may be standardized for a particular type of alert device 210. For example, user device 220 may determine that alert device 210 is a smoke alarm, and may determine that alert device 210 is associated with a smoke alarm alert profile.

In some implementations, user device 220 may be configured to monitor multiple alert devices 210. For example, user device 220 may configure a first alert profile associated with monitoring for alerts from a first alert device 210, and may configure one or more other alert profiles associated with monitoring for alerts from one or more other alert devices 210.

Configuring recognition of the alert by user device 220 may include determining a threshold similarity level, in some implementations. For example, user device 220 may determine a threshold similarity level with which a detected alert, when compared to the configured alert (e.g., the alert associated with alert device 210 that user device 220 is configured to detect), is determined to be matching the configured alert. In some implementations, user device 220 may determine the threshold similarity level based on user input. Additionally, or alternatively, user device 220 may receive information identifying the threshold similarity level from alert management device 240. For example, user device 220 may provide information identifying alert device 210 to alert management device 240, and may receive information from alert management device 240 identifying the threshold similarity level for an alert potentially detected from alert device 210.

As further shown in FIG. 4, process 400 may include determining a response action to be associated with the alert (block 420). For example, user device 220 may determine the response action to be associated with the configured alert (e.g., the alert that user device 220 is to detect). A response action may refer to an action taken as a result of detecting an alert, such as providing information, adjusting a configuration, or the like. In some implementations, user device 220 may determine the response action to be associated with the alert based on user input. For example, a user may provide input to user device 220 indicating one or more response actions. In some implementations, user device 220 may determine the response action based on a type associated with alert device 210. For example, user device 220 may provide information identifying alert device 210 as a particular type (e.g., a smoke alarm, a laundry machine, etc.) to alert management device 240, and may receive information indicating a set of response actions that may be associated with the alert from alert device 210. For example, when alert device 210 is a fire alarm, alert management device 240 may provide information to user device 220 indicating that response actions may include providing a notification to alert recipient device 250 (e.g., a device associated with a resident of a building, a fire department, a resident of a neighboring building, etc.).

In some implementations, user device 220 may configure the response action to include providing a notification to alert recipient device 250, such as providing information identifying alert device 210, a location at which the alert is detected, or the like. For example, user device 220 may configure the response action to include providing a location identifier (e.g., a global positioning system (GPS) coordinate identifier, an address identifier, etc.) to alert recipient device 250. Additionally, or alternatively, the response action may include causing an adjustment to alert recipient device 250. For example, when alert recipient device 250 is a mobile phone, user device 220 may configure the response action to include adjusting a configuration of alert recipient device 250 from a silent mode to an audible mode to ensure that a user of alert recipient device 250 receives notification of the alert.

In some implementations, the response action may be associated with a criticality determination. For example, user device 220 may determine the alert to be a critical alert, and may provide a user with a set of response actions associated with critical alerts. Additionally, or alternatively, user device 220 may determine the alert to be a non-critical alert, and may provide the user with another set of response actions associated with non-critical alerts.

As further shown in FIG. 4, process 400 may include storing information identifying the alert and the response action (block 430). For example, user device 220 may provide information identifying the alert and/or the response action to alert management device 240 for storage. Additionally, or alternatively, user device 220 may store information identifying the alert and/or the response action locally.

Information identifying the alert and/or the response action may include information associated with determining whether a detected alert matches the alert, in some implementations. For example, user device 220 may store information identifying a wave form associated with the alert (e.g., a wave form determined based on recording the alert, a wave form determined based on identifying the alert, etc.), an identification of the alert (e.g., an identification of alert device 210 associated with the alert), the threshold similarity level associated with determining whether a detected alert matches the alert, or the like. Information identifying the response action may include information associated with performing the response action, in some implementations. For example, user device 220 may store an identifier of alert recipient device 250, an indication of the response action, or the like.

Storing information identifying the alert and/or the response action may include distributing the information to one or more other user devices 220 that are to be used for alert monitoring, in some implementations. For example, when alert device 210 is associated with a particular geographic location, user device 220 may distribute information associated with detecting the alert (e.g., an alert profile, a pattern, a wave form, etc.) to one or more other user devices 220 (e.g., via alert management device 240 and/or network 230) associated with the particular geographic location. In this case, alert management device 240 may determine one or more other user devices 220 in a proximity to the particular geographic location, and may provide information associated with detecting the alert for storage.

In this way, detection of an alert, associated with an alert device, by a user device and a subsequent response action may be configured using the user device.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5B:
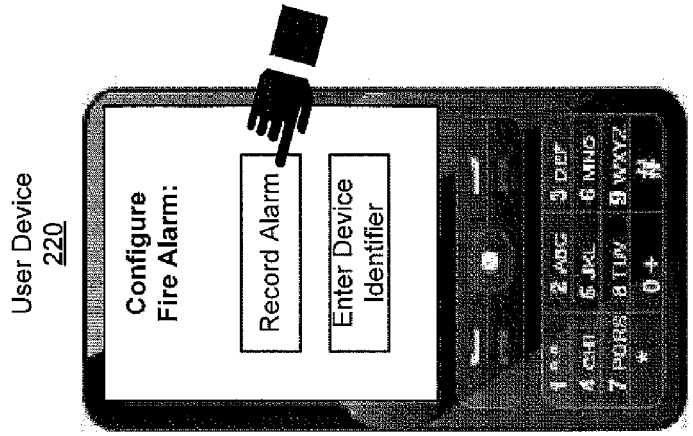
Figure 5A:
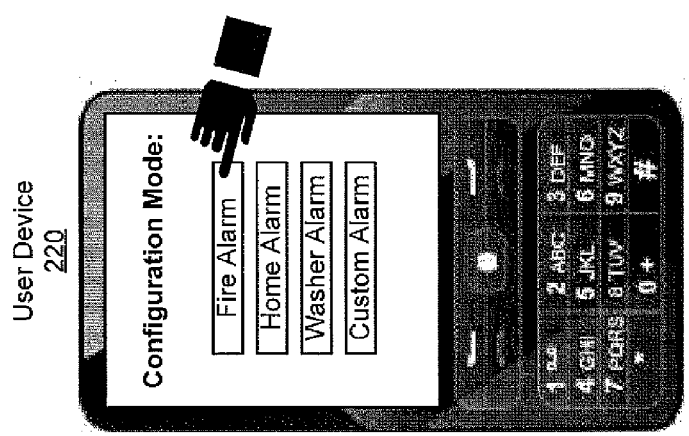

FIGS. 5A-5F are diagrams of an example implementation 500 relating to process 400 shown in FIG. 4. As shown in FIG. 5A, example implementation 500 may include user device 220. User device 220 provides a user interface with which to configure detection of an alert, and with which to configure a response action to be taken based on detecting the alert. Based on user interaction with the "Fire Alarm" button, user device 220 determines that the alert is to be associated with a fire alarm. As shown in FIG. 5B, user device 220 configures an alert profile associated with the alert (e.g., the fire alarm) by recording the alert and/or by providing a device identifier associated with the alert (e.g., information identifying the fire alarm). Based on user interaction with the "Record Alarm" button, user device 220 determines that the alert profile for the alert is to be identified by recording the alert.

Figure 5D:
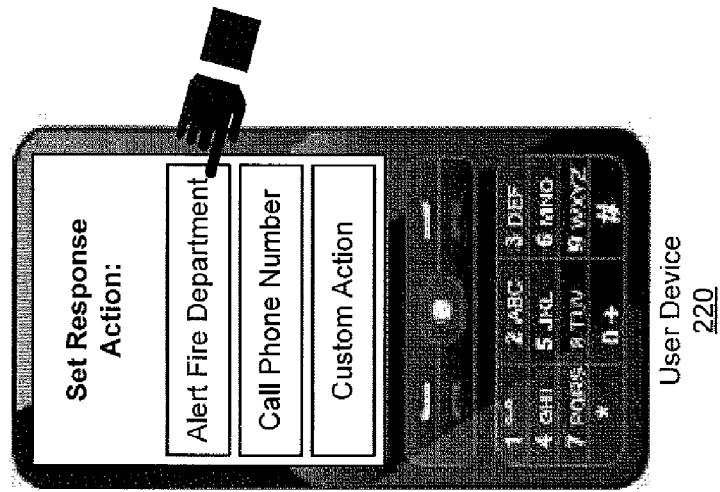
Figure 5C:
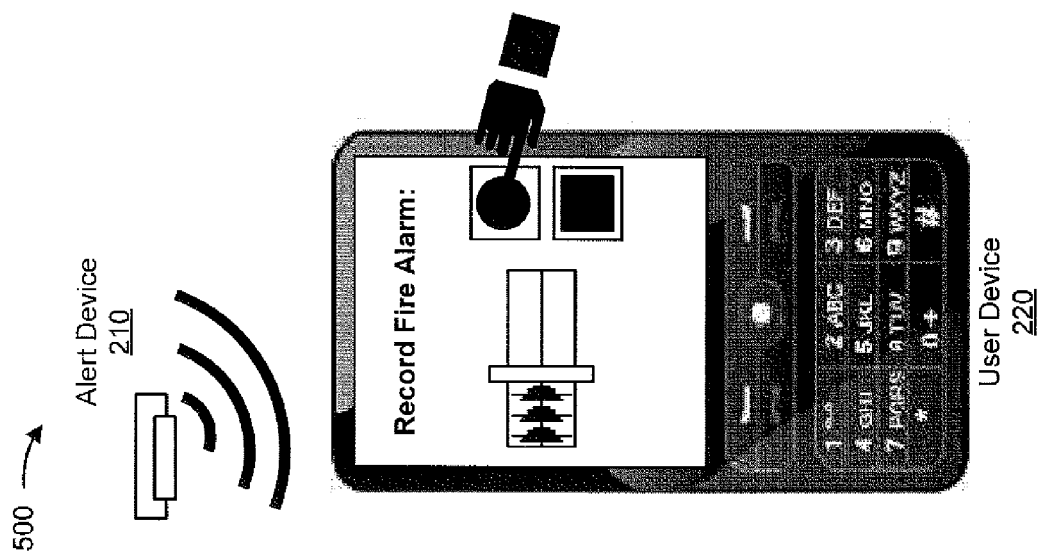

As shown in FIG. 5C, based on user interaction with a button (e.g., a record button), user device 220 may record the alert (e.g., an audible alert from alert device 210). As shown in FIG. 5D, user device 220 provides a set of response actions associated with the fire alarm, such as "Alert Fire Department," "Call Phone Number," or take a "Custom Action" (e.g., allow user specification of another type of response action). Based on user interaction with the "Alert Fire Department" button, user device 220 associates notifying a fire department (e.g., via alert recipient device 250, not shown) with detecting the alert from alert device 210.

As shown in FIG. 5E, user device 220 provides a set of notifications that may be provided when notifying the fire department, such as to "Send GPS Coordinates" (e.g., GPS coordinates associated with a location of user device 220), and/or to "Send Static Address" (e.g., an address identifier associated with a location of alert device 210). Based on user interaction with the "Send Static Address" button, user device 220 determines to provide a location associated with alert device 210. As shown in FIG. 5F, user device 220 provides confirmation of the alert and the response action. Based on user interaction with the "Store via Alert Management Device" button, user device 220 provides information identifying the alert and the response action to alert management device 240. In this case, the information provided by user device 220 to alert management device 240 includes information identifying the alert type (e.g., "Fire Alarm"), an alert profile (e.g., a data file storing the recording of the alert "sound_file.wav"), and an indication of the response action (e.g., send the static address "221b Baker St" to the fire department).

As indicated above, FIGS. 5A-5F are provided merely as an example. Other examples are possible and may differ from what was described with regard to FIGS. 5A-5F.

FIG. 6 is a flow chart of an example process 600 for monitoring an alert via a user device. In some implementations, one or more process blocks of FIG. 6 may be performed by user device 220. Additionally, or alternatively, one or more process blocks of FIG. 6 may be performed by another device or a group of devices separate from or including user device 220, such as alert device 210, alert management device 240, and/or alert recipient device 250.

As shown in FIG. 6, process 600 may include determining that an alert has been triggered (block 610). For example, user device 220 may determine that alert device 210 is triggering the alert. In some implementations, user device 220 may utilize a detection mode to determine that the alert has been triggered. For example, user device 220 may actively maintain one or more sensors, such as an audio sensor (e.g., a microphone), a visual sensor (e.g., a camera), or the like. In some implementations, the detection mode may include components associated with other processing operations of user device 220 that are inactive (e.g., a passive detection mode). For example, determining that the alert has been triggered may include waking user device 220 from the detection mode, and reactivating the components associated with the other processing operations.

Determining that an alert has been triggered may include detecting a potential alert, in some implementations. For example, user device 220 may receive information indicating that the potential alert may have been triggered based on detecting a wave (e.g., a sound wave, a light wave, etc.) via an audio sensor, a visual sensor, or the like. In this case, user device 220 may identify the potential alert as matching a particular configured alert (e.g., a fire alarm, a security alarm, a home appliance, etc.). In some implementations, user device 220 may utilize one or more sensors configured to provide information via network 230. For example, user device 220 may connect to a high sensitivity microphone in a house, and may receive information identifying input to the high sensitivity microphone.

In some implementations, user device 220 may provide the potential alert to alert management device 240, and alert management device 240 may identify the potential alert as matching the particular configured alert. For example, user device 220 may record the potential alert via a microphone, and may provide the recording to alert management device 240 for processing.

Determining that the alert has been triggered may include comparing the potential alert to the configured alert. For example, user device 220 may determine a similarity measurement between the potential alert and the configured alert. In some implementations, user device 220 may determine that the alert has been triggered based on the similarity measurement satisfying a threshold similarity level.

As further shown in FIG. 6, process 600 may include determining a response action associated with the alert (block 620). For example, user device 220 may determine the response action associated with the configured alert based on determining that the detected alert matches the configured alert. In some implementations, user device 220 may receive information identifying the response action from alert management device 240. For example, alert management device 240 may provide one or more stored response actions associated with the configured alert. In some implementations, user device 220 may determine the response action based on the similarity measurement. For example, a first similarity measurement may be associated with a first response action, and a second similarity measurement may be associated with a second response action. In this case, user device 220 may provide information identifying the similarity measurement to alert management device 240.

As further shown in FIG. 6, process 600 may include performing the response action based on determining that the alert has been triggered (block 630). For example, user device 220 may perform the response action associated with the configured alert. Performing the response action may include providing a notification to alert recipient device 250, adjusting a configuration of alert recipient device 250 (e.g., adjusting a volume mode, a screen brightness, a laundry cycle setting, etc.), indicating that alert recipient device 250 is to perform an action (e.g., dispatching emergency personnel, turning on another device associated with alert recipient device 250, etc.), or the like. In some implementations, alert management device 240 may perform the response action associated with the alert. For example, user device 220 may provide an indication to alert management device 240 that the alert associated with alert device 210 has been triggered, and alert management device 240 may perform the response action based on receiving the indication.

In this way, a user device may detect an alert from an alert device, and may perform an associated response action based on detecting the alert.

Although FIG. 6 shows example blocks of process 600, in some implementations, process 600 may include additional blocks, different blocks, fewer blocks, or differently arranged blocks than those depicted in FIG. 6. Additionally, or alternatively, two or more of the blocks of process 600 may be performed in parallel.

Figure 7A:
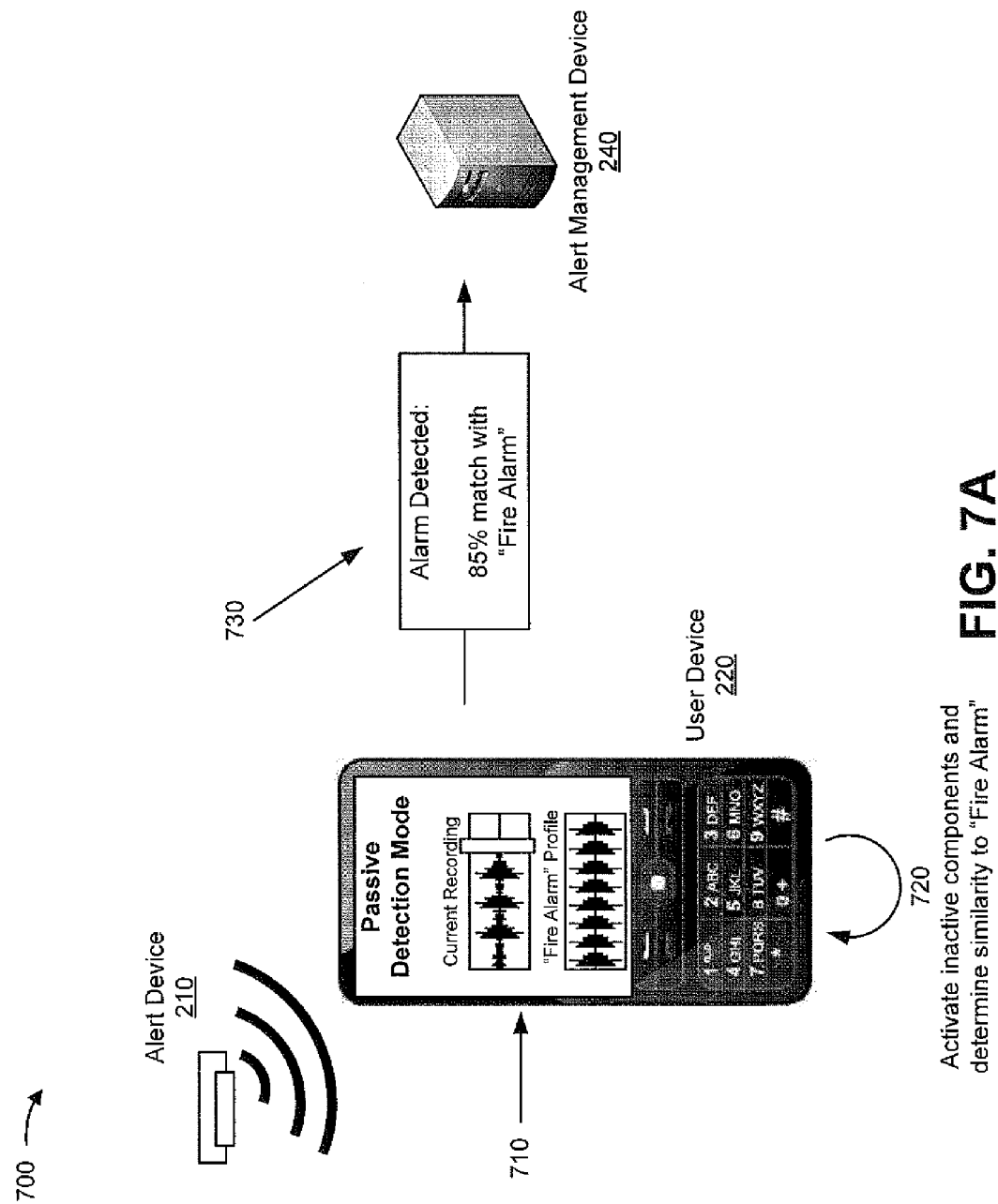
FIGS. 7A and 7B are diagrams of an example implementation relating to the example process shown in FIG. 6.
Figure 7B:
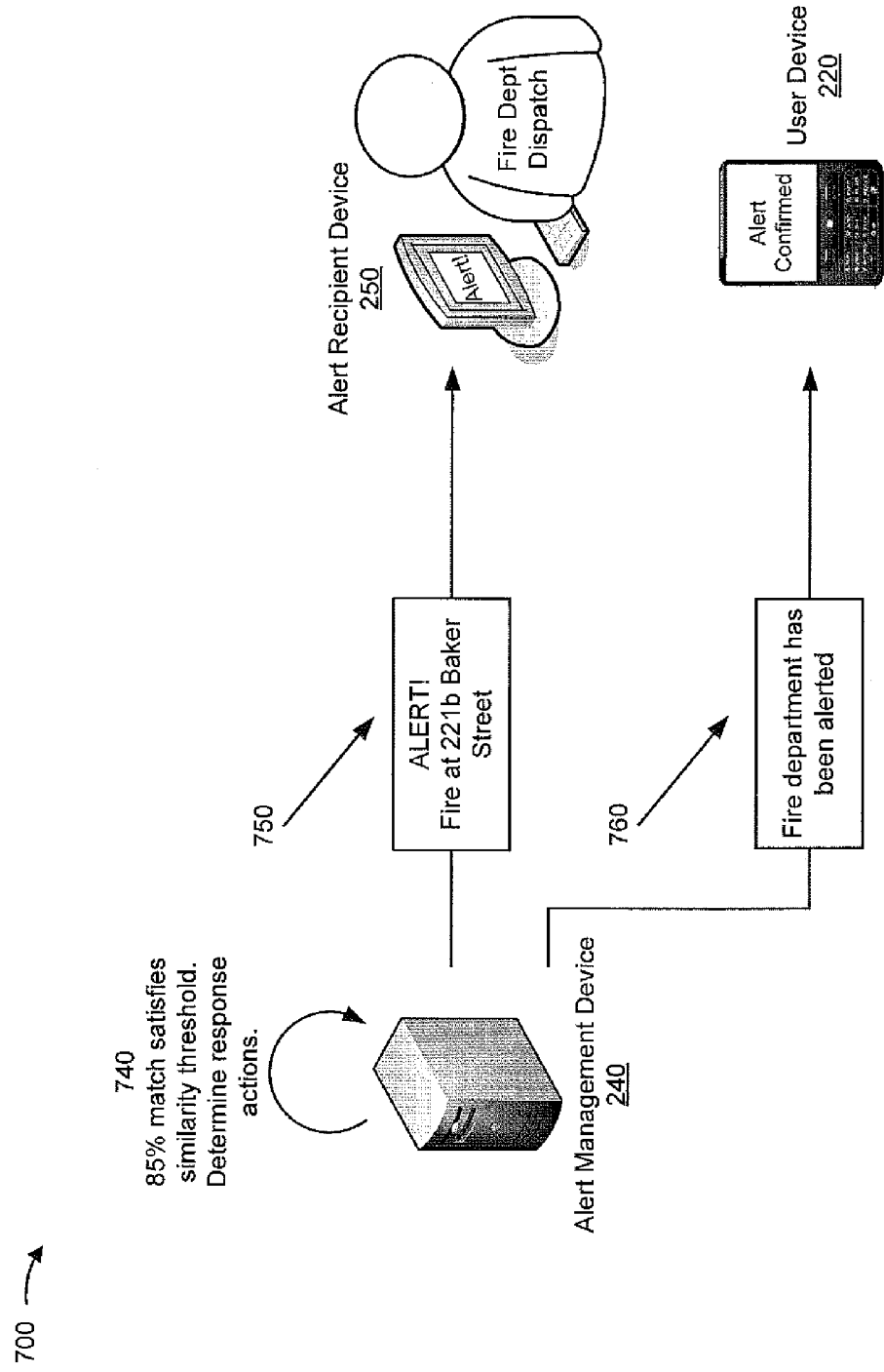

FIGS. 7A and 7B are diagrams of an example implementation 700 relating to process 600 shown in FIG. 6. As shown in FIG. 7A, example implementation 700 may include alert device 210, user device 220, and alert management device 240. Assume that user device 220 is configured to detect an alert (e.g., "Fire Alarm") from alert device 210. As shown by reference number 710, user device 220 is monitoring for an alert from alert device 210. User device 220 detects the alert from alert device 210, and, as shown by reference number 720, activates inactive components to determine whether the detected alert matches the alert that user device 220 is configured to detect (e.g., "Fire Alarm"). User device 220 compares the recorded wave form with the wave form associated with "Fire Alarm" and, as shown by reference number 730, user device 220 provides information to alert management device 240 indicating that the detected alert matches "Fire Alarm" (e.g., the detected alert is an "85% match with 'Fire Alarm'").

As shown in FIG. 7B, and by reference number 740, alert management device 240 determines that an 85% similarity measurement between the detected alert and "Fire Alarm" satisfies a threshold similarity measurement. As shown by reference number 750, alert management device 240 performs a first response action by providing a message to alert recipient device 250 associated with a fire department dispatch (e.g., a message indicating a "Fire at221b Baker Street"). As shown by reference number 760, alert management device 240 performs a second response action by providing a message to user device 220 (e.g., a message indicating that the "Fire department has been alerted").

As indicated above, FIGS. 7A and 7B are provided merely as an example. Other examples are possible and may differ from what was described with regard to FIGS. 7A and 7B.

Figure 8A:
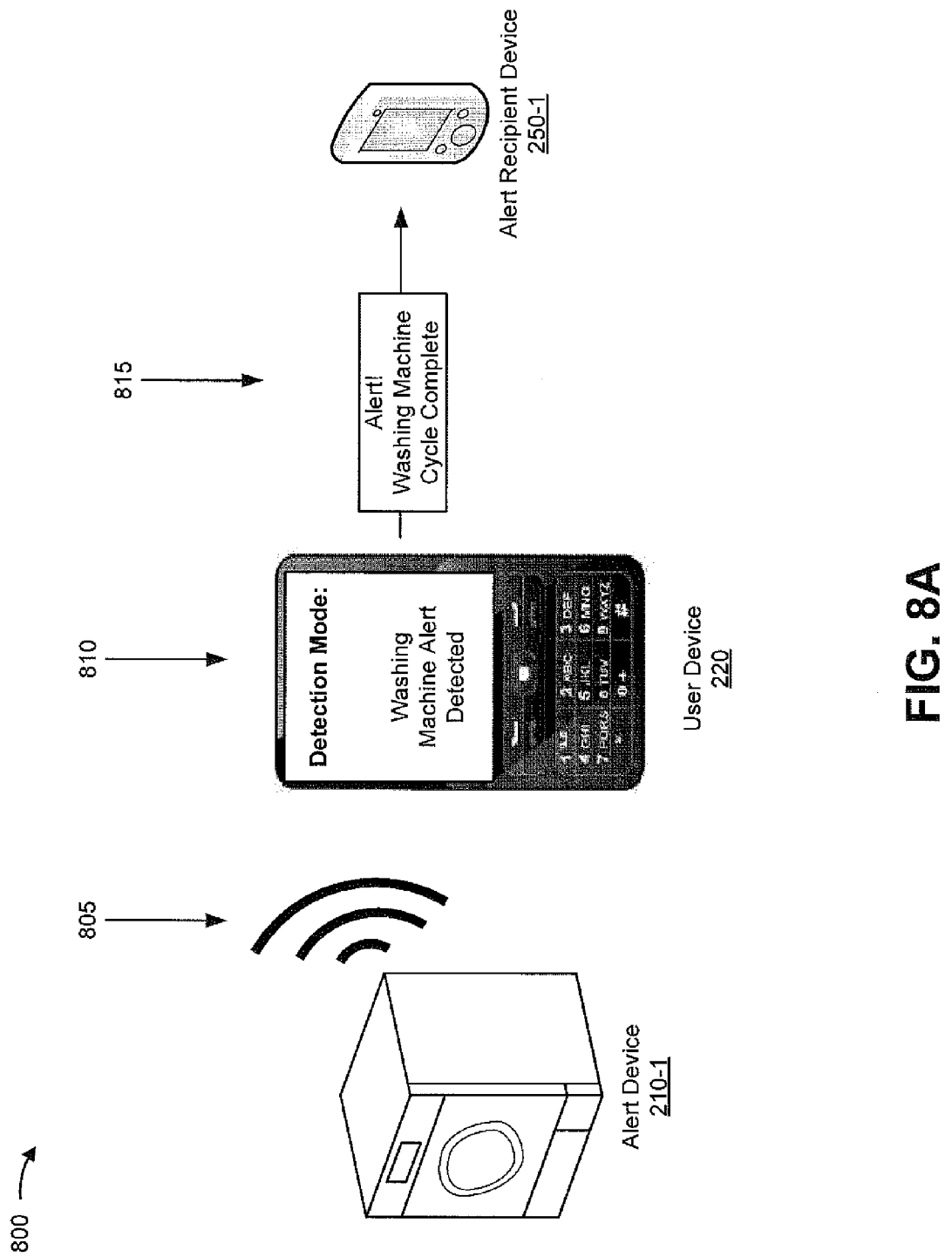
FIGS. 8A-8D are diagrams of example implementations relating to the example process shown in FIG. 6.

FIGS. 8A-8D are diagrams of example implementations 800-803 relating to process 600 shown in FIG. 6. As shown in FIG. 8A, example implementation 800 may include alert device 210-1 (e.g., a laundry machine), user device 220 (a first mobile phone), and alert recipient device 250-1 (e.g., a second mobile phone). Assume that user device 220 has been configured to recognize an alert generated by alert device 210-1. As shown by reference number 805, when a laundry cycle has completed, alert device 210-1 provides an audible alert (e.g., a set of noises). As shown by reference number 810, user device 220 detects the audible alert and determines that the audible alert is associated with alert device 210-1. User device 220 determines a response action associated with recognizing that the alert is associated with alert device 210-1, and, as shown by reference number 815, performs the response action by providing a notification (e.g., a short message service (SMS) message) to alert recipient device 250-1.

Figure 8B:
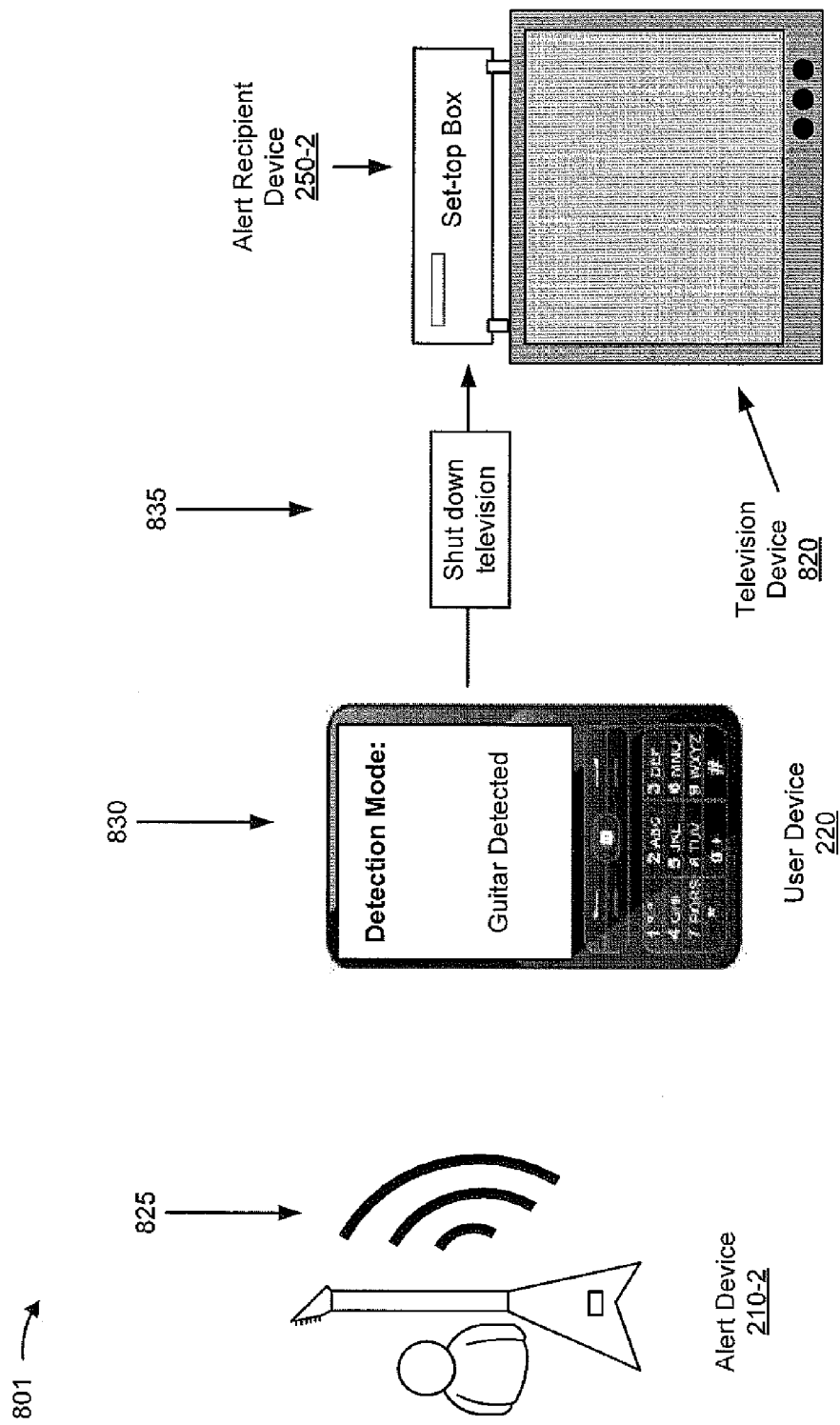

As shown in FIG. 8B, example implementation 801 may include alert device 210-2 (e.g., a guitar), user device 220, alert recipient device 250-2 (e.g., a set-top box), and television device 820. Assume that user device 220 has been configured to recognize music from a guitar as an alert, and that television device 820 is on. As shown by reference number 825, a user uses alert device 210-2 (e.g., plays music using the guitar), thereby generating an alert. As shown by reference number 830, user device 220 recognizes the alert (e.g., the music), and determines a response action associated with recognizing the alert. As shown by reference number 835, user device 220 performs the response action by providing a message (e.g., "Shut down television") to alert recipient device 250-2 (e.g., via network 230), and alert recipient device 250-2 causes television device 820 to shut down based on the message.

Figure 8C:
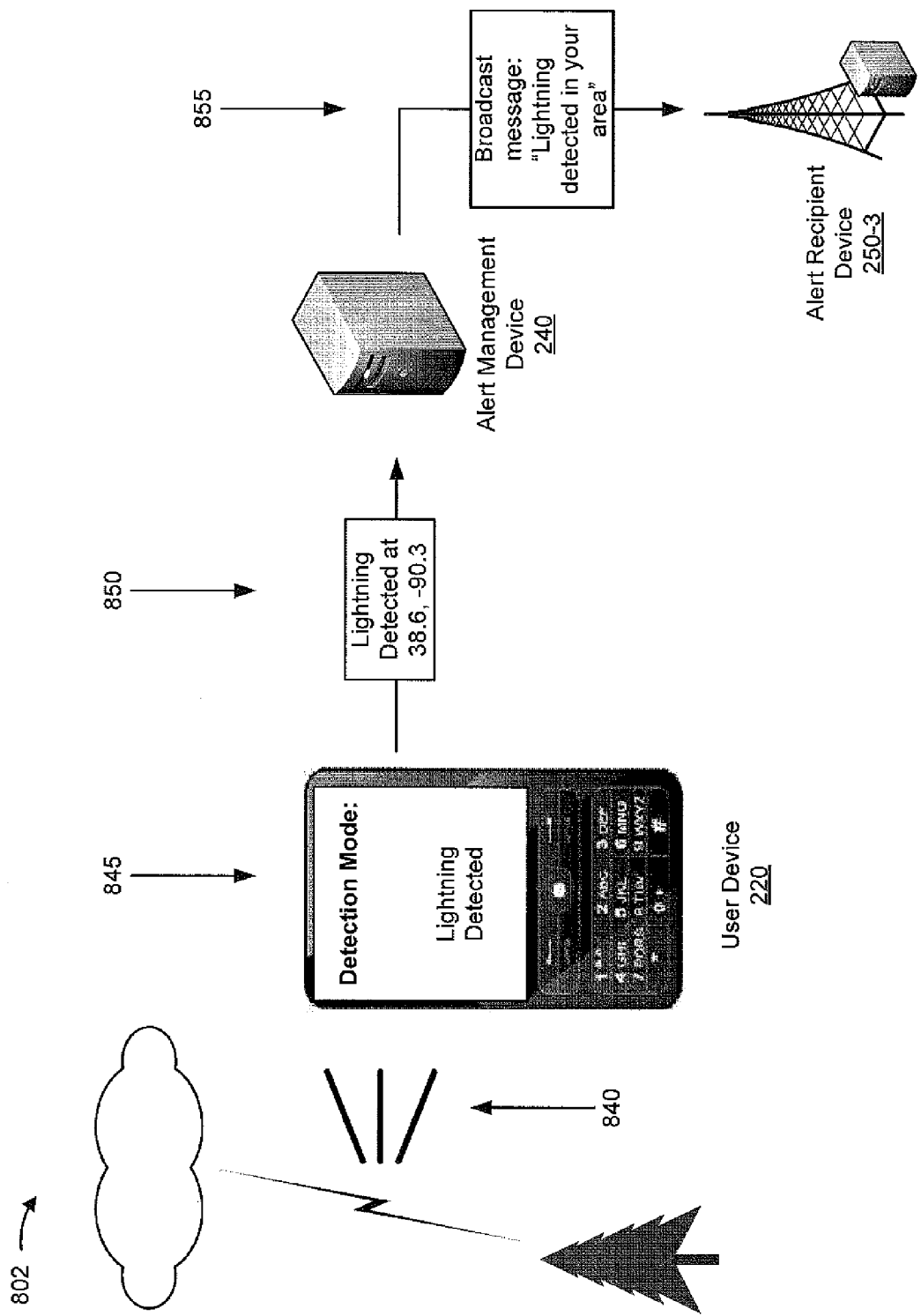

As shown in FIG. 8C, example implementation 802 may include user device 220, alert management device 240, and alert recipient device 250-3 (e.g., a cellular network base station). Assume that user device 220 has been configured to recognize a lightning flash as an alert. As shown by reference number 840, lightning strikes a tree thereby generating an alert. As shown by reference number 845, user device 220 recognizes the alert (e.g., detects the lightning flash via a camera associated with user device 220), and determines a response action associated with recognizing the alert.

Assume that the response action is to notify other nearby user devices 220 (not shown) that a lightning flash has been detected. In this case, user device 220 determines a location associated with the alert (e.g., GPS coordinates associated with user device 220), and, as shown by reference number 850, provides information identifying the location to alert management device 240. As shown by reference number 855, alert management device 240 provides an indication to alert recipient device 250-3 that alert recipient device 250-3 is to notify the other nearby user devices 220 that a lightning flash has been detected.

Figure 8D:
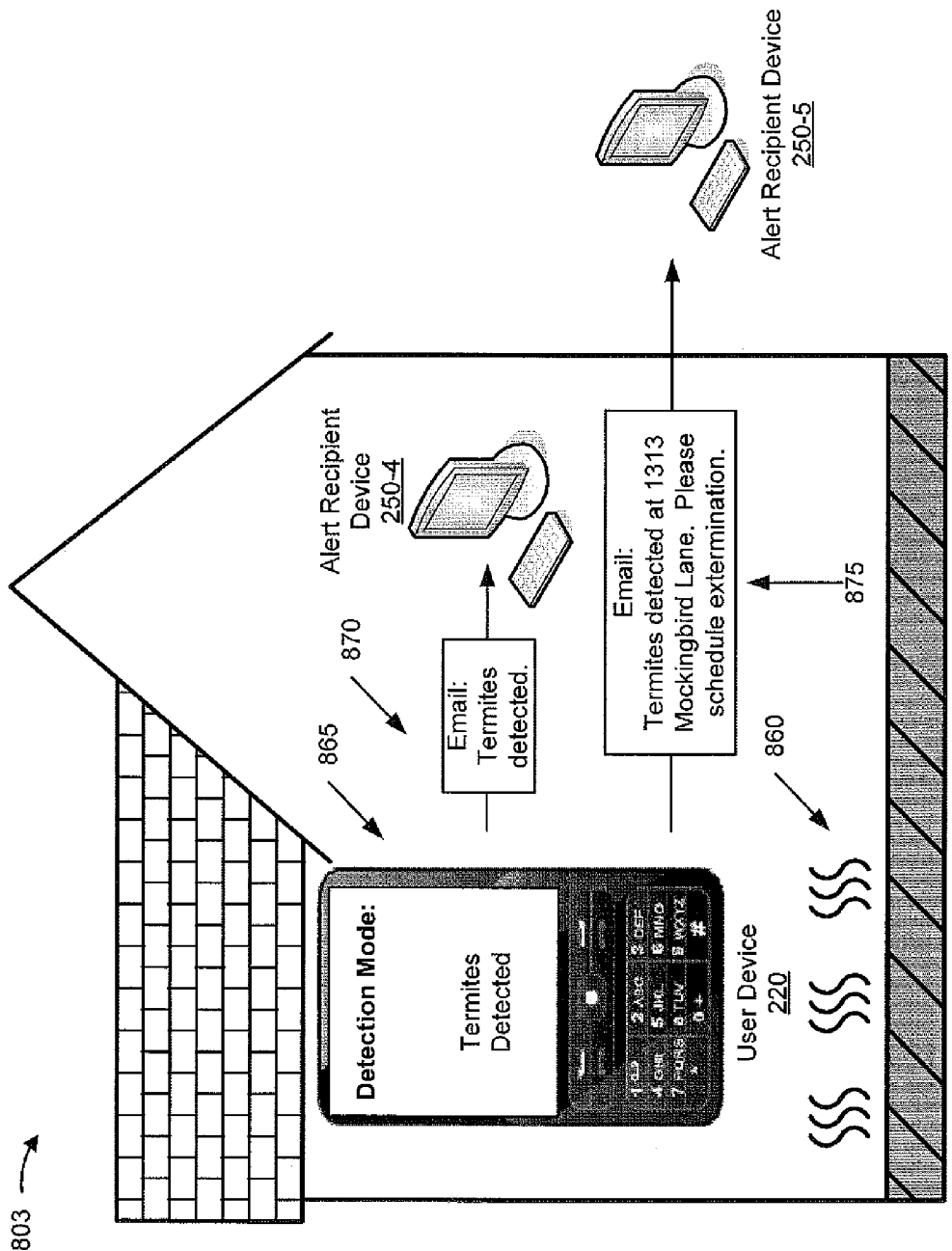

As shown in FIG. 8D, example implementation 803 may include user device 220, alert recipient device 250-4 (e.g., a first computer that is associated with a user of user device 220), and alert recipient device 250-5 (e.g., a second computer that is associated with a termite exterminator). Assume that user device 220 has been configured to recognize the sub-audible vibrations associated with termites as an alert. As shown by reference number 860, termites in a floor of a home create a sub-audible vibration. As shown by reference number 865, user device 220 detects the sub-audible vibrations (e.g., via a microphone associated with user device 220), and recognizes the sub-audible vibrations to be an alert. User device 220 determines multiple response actions associated with the alert. As shown by reference number 870, user device 220 performs a first response action by sending a notification (e.g., via an email) to alert recipient device 250-4 (e.g., indicating that "Termites detected."). As shown by reference number 875, user device 220 performs a second response action by sending another notification (e.g., via an email) to alert recipient device 250-5 (e.g., "Termites detected at 1313 Mockingbird Lane. Please schedule extermination.").

As indicated above, FIGS. 8A-8D are provided merely as an example. Other examples are possible and may differ from what was described with regard to FIGS. 8A-8D.

Implementations described herein may assist a user device in configuring detection of an alert and performance of a response action associated with the alert.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
configure a recognition of a first alert;
store information associated with the recognition of the first alert;
determine a response action to be associated with the recognition of the first alert;
store information identifying an association between the first alert and the response action;
detect a second alert;
determine that the second alert matches the first alert based on the information associated with the recognition of the first alert;
retrieve the stored information identifying the association between the first alert and the response action based on determining that the second alert matches the first alert; and
perform the response action based on retrieving the stored information identifying the association between the first alert and the response action.

2. The device of claim 1, where the one or more processors, when configuring recognition of the first alert, are further to:
record an instance of the first alert; and
where the one or more processors, when determining that the second alert matches the first alert, are further to:
determine that the second alert matches the recorded instance of the first alert; and
determine that the second alert matches the first alert based on the second alert matching the recorded instance of the first alert.

3. The device of claim 1, where the one or more processors, when configuring recognition of the first alert, are further to:
determine an alert source identifier,
the alert source identifier being an identifier of a source for the first alert; and
determine an alert profile based on the alert source identifier,
the alert profile identifying one or more characteristics of the first alert; and
where the one or more processors, when determining that the second alert matches the first alert, are further to:
determine one or more characteristics of the second alert;
determine that the one or more characteristics of the second alert match the one or more characteristics of the first alert; and
determine that the second alert matches the first alert based on determining that the one or more characteristics of the second alert match the one or more characteristics of the first alert.

4. The device of claim 1, where the one or more processors, when configuring recognition of the first alert, are further to:
 determine an alert similarity threshold; and
 where the one or more processors, when determining that the second alert matches the first alert, are further to:
  determine a similarity score that reflects a measure of similarity between the second alert and the first alert;
  determine that the similarity score satisfies the alert similarity threshold; and
  determine that the second alert matches the first alert based on determining that the similarity score satisfies the alert similarity threshold.

5. The device of claim 1, where the one or more processors are further to:
 determine that the device has entered a passive detection mode; and
 where the one or more processors, when detecting the second alert, are further to:
  wake the device from the passive detection mode.

6. The device of claim 1, where the one or more processors, when storing information associated with the recognition of the first alert, are further to:
 provide the information associated with recognition of the first alert; and
 where the one or more processors, when determining that the second alert matches the first alert, are further to:
  receive information associated with determining that the second alert matches the first alert; and
  determine that the second alert matches the first alert based on the received information associated with determining that the second alert matches the first alert.

7. The device of claim 1, where the one or more processors, when determining that the second alert matches the first alert, are further to:
 provide information associated with the second alert to an alert management device; and
 receive an indication that the second alert matches the first alert from the alert management device.

8. A non-transitory computer-readable medium storing instructions, the instructions comprising:
 one or more instructions that, when executed by one or more processors, cause the one or more processors to:
  configure an alert profile,
   the alert profile including one or more first audio or video characteristics;
  determine one or more response actions to be associated with the alert profile;
  store an association between the alert profile and the one or more response actions;
  detect an alert;
   the alert being associated with one or more second audio or video characteristics;
  determine that the one or more second audio or video characteristics match the one or more first audio or video characteristics;
  determine that the alert matches the alert profile based on determining that the one or more second audio or video characteristics match the one or more first audio or video characteristics;
  retrieve at least one response action, of the one or more response actions, based on determining that the alert matches the alert profile; and
  perform the at least one response action.

9. The non-transitory computer-readable medium of claim 8, where the one or more instructions, that cause the one or more processors to configure the alert profile, further cause the one or more processors to:
 determine an audio or video characteristic similarity threshold associated with the alert profile; and
 where the one or more instructions, that cause the one or more processors to determine that the one or more second audio or video characteristics match the one or more first audio or video characteristics, further cause the one or more processors to:
  determine a similarity measurement between the one or more second audio or video characteristics and the one or more first audio or video characteristics;
  determine that the similarity measurement between the one or more second audio or video characteristics and the one or more first audio or video characteristics satisfies the audio or video characteristic similarity threshold; and
  determine that the one or more second audio or video characteristics match the one or more first audio or video characteristics based on determining that the similarity measurement between the one or more second audio or video characteristics and the one or more first audio or video characteristics satisfies the audio or video characteristic similarity threshold.

10. The non-transitory computer-readable medium of claim 9, where the one or more instructions, that cause the one or more processors to retrieve the at least one response action of the one or more response actions, further cause the one or more processors to:
 retrieve the at least one response action of the one or more response actions based on the similarity measurement between the one or more second audio or video characteristics and the one or more first audio or video characteristics.

11. The non-transitory computer-readable medium of claim 8, where the one or more instructions, that cause the one or more processors to perform the at least one response action, further cause the one or more processors to:
 perform a first response action,
  the first response action including transmitting an indication that the alert matches the alert profile;
 receive confirmation that the first response action was successfully transmitted; and
 perform a second response action based on receiving the confirmation,
  the second response action including notifying a user that the first response action was successfully transmitted.

12. The non-transitory computer-readable medium of claim 8, where the one or more instructions, when executed by the one or more processors, further cause the one or more processors to:
 determine a current location,
  the current location being associated with the alert profile;
 provide an indication of the current location; and
 receive information associated with detecting the alert based on providing the indication of the current location; and
 where the one or more instructions, that cause the one or more processors to detect the alert, further cause the one or more processors to:
  detect the alert based on the information associated with detecting the alert.

13. The non-transitory computer-readable medium of claim 8, where the one or more instructions, that cause the one or more processors to perform the at least one response action, further cause the one or more processors to:
  determine that the at least one response action includes providing an audible alert to a user;
  determine that a silent mode is active;
  adjust a configuration associated with deactivating the silent mode; and
  provide the audible alert based on adjusting the configuration associated with deactivating the silent mode.

14. The non-transitory computer-readable medium of claim 8, where the one or more instructions, that cause the one or more processors to configure the alert profile, further cause the one or more processors to:
  determine a sensor with which to detect the alert; and
  where the one or more instructions, that cause the one or more processors to detect the alert, further cause the one or more processors to:
    detect the alert via the sensor.

15. A method, comprising:
  receiving, by a device, information associated with determining that an alert has been triggered;
  determining, by the device, a response action to be associated with determining that the alert has been triggered;
  storing, by the device, an association between the response action and the alert;
  determining, by the device, that the alert has been triggered based on the information associated with determining that the alert has been triggered;
  retrieving, by the device, the response action associated with the alert based on determining that the alert has been triggered; and
  performing, by the device, the response action based on retrieving the response action.

16. The method of claim 15, where determining that the alert has been triggered further comprises:
  receiving information identifying a potential alert from one or more sensors;
  determining that the potential alert matches the alert; and
  determining that the alert has been triggered based on determining that the potential alert matches the alert.

17. The method of claim 15, where performing the response action further comprises:
  determining a location associated with the alert; and
  providing an indication of the location associated with the alert.

18. The method of claim 15, further comprising:
  recording a sound,
  where receiving information associated with determining that the alert has been triggered further comprises:
    receiving information identifying a wave form associated with the recorded sound.

19. The method of claim 15, where determining the response action to be associated with determining that the alert has been triggered further comprises:
  receiving information identifying a type of the alert;
  identifying one or more notification recipients to be associated with the alert based on the information identifying the type of the alert; and
  determining the response action based on identifying the one or more notification recipients; and
  where performing the response action further comprises:
    providing a notification of the alert to the one or more notification recipients.

20. The method of claim 19, where identifying one or more notification recipients further comprises:
  receiving information identifying a dispatch associated with the alert type; and
  where providing the notification of the alert to the one or more notification recipients further comprises:
    providing the notification of the alert to the dispatch associated with the alert.

* * * * *